April 10, 1951 D. C. WALKER 2,548,412
SEALING UNIT FOR WELL CASING HEADS
Filed May 24, 1948

D.C. WALKER
*INVENTOR.*

BY

*ATTORNEY*

Patented Apr. 10, 1951

2,548,412

UNITED STATES PATENT OFFICE 2,548,412

SEALING UNIT FOR WELL CASING HEADS

David C. Walker, Tulsa, Okla., assignor to Hinderliter Tool Company Division H. K. Porter Company, Inc., a corporation of Pennsylvania Application May 24, 1948, Serial No. 28,791

2 Claims. (Cl. 288—1)

This invention relates to packing heads for wells, and particularly to sealing units normally employed in such heads to form fluid-tight seals between a well casing and a smaller diameter pipe, such as tubing, which extends into the casing.

In the petroleum industry such sealing units are variously termed, "blow-out preventors," "tubing strippers," "oil savers," and the like, but in all cases, their primary purpose is to prevent leakage of well fluids through the annular space between a well casing and a smaller diameter pipe inserted therethrough and particularly to prevent uncontrolled escape of fluid from the well casing during the operations of running strings of pipe into and out of the well casing. It is essential, particularly when dealing with wells under high pressure, that such seals be very efficient in their sealing action, while at the same time permitting the ready movement through the seals of smaller pipe strings, including the couplings which form somewhat larger diameter projections on the pipe strings. The sealing elements must, therefore, be sufficiently flexible to accommodate the varying diameters of such pipe strings while maintaining effective sealing action therewith under the high pressures which may be encountered.

Accordingly, it is a principal object of this invention to provide an improved form of packing head for wells which employs a sealing unit of relatively simple form and which forms a highly efficient seal particularly during the operation of running a smaller pipe string into and out of a well.

An important object is the provision of a sealing unit which employs the pressures existant in the well to improve the efficiency of the seal.

Other and more specific objects and advantages will become apparent from the following detailed description when read in conjunction with the accompanying drawings which illustrate one useful embodiment in accordance with this invention.

Figure 1:
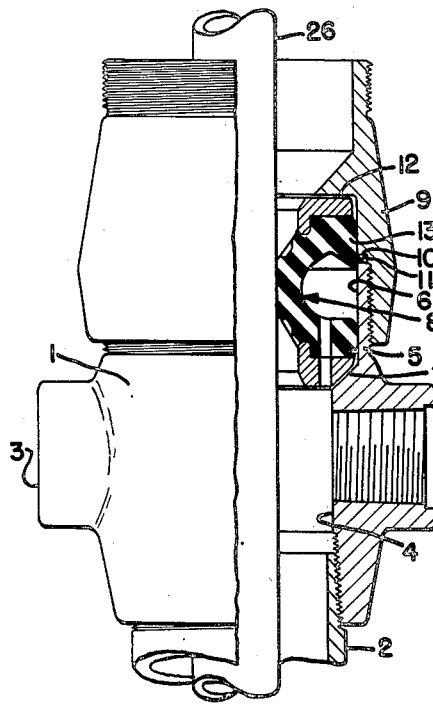
Fig. 1 is a quarter-sectional elevational view of a well head employing a sealing unit in accordance with this invention.
Figure 2:
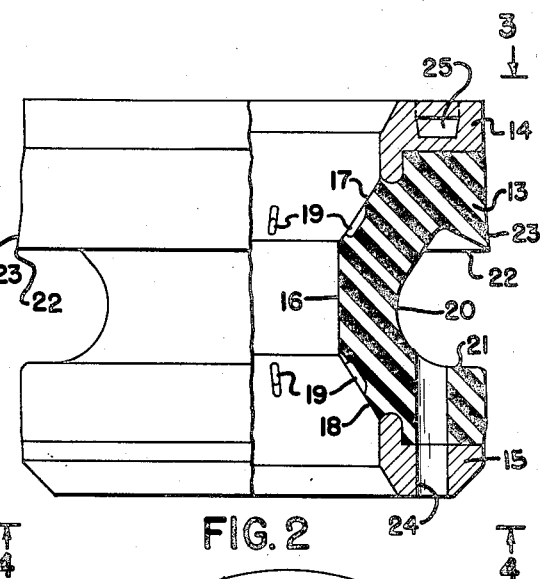
Fig. 2 is a quarter-sectional elevational view of the sealing unit.

Referring to the drawings and first to Fig. 1, there is a conventional tubular casing head 1 mounted on the upper end of a well casing 2 and provided with side outlets 3, 3 which are adapted for connection of pipes through which fluids may be discharged from, or introduced into, the casing in the conventional manner. Casing head 1 has the usual hollow bore 4 registering with the bore of casing 2. The upper end of casing head 1 is provided with the usual tubular stuffing box 5 having a bore 6 of somewhat larger diameter than that of bore 4 to provide at the bottom thereof a generally annular shoulder 7 adapted to form a bottom seat for a sealing unit, designated generally by the numeral 8. A tubular housing 9 is adapted to be screwed down over the upper end of stuffing box 5 and is provided internally with an annular shoulder 10 registering with the upper edges of stuffing box 5. Packing 11 of any suitable form is arranged between shoulder 10 and the upper end of stuffing box 5 to form a fluid-tight seal therebetween. Housing 9 is provided interiorly thereof with an inwardly extending annular gland 12 cooperating with the upper end of sealing unit 8. The bore of housing 9 above gland 12 is adapted to receive the usual pipe hanger and upper sealing elements, well known in this art, which are conventionally employed in casing heads of the type described but which form no part of the present invention, and are, accordingly not illustrated.

Sealing unit 8, comprises a generally tubular flexible sleeve 13, constructed of conventional rubber or rubber-like composition material, which is flexible and resilient and is normally constructed or formed in the desired shape by molding. Upper and lower metal end rings 14 and 15, respectively are fixedly attached to the respective upper and lower ends of sleeve 13, as by vulcanization during the molding of the sleeve, to form therewith a unitary structure. The external diameter of sleeve 13 is preferably made slightly larger than that of end rings 14 and 15 so that the sleeve material protrudes slightly beyond the outer edges of the end rings into contact with the inner wall of stuffing box 5 and housing 9. The upper face of upper end ring 14 and the lower face of lower end ring 15 are shaped to complement the contiguous surfaces of gland 12 and seat 7, respectively. The inner surface of sleeve 13 is provided with a straight medial portion 16 somewhat thicker than the ends of the sleeve, and is joined therewith by appropriate upwardly and downwardly sloping surfaces 17 and 18 respectively. A plurality of angularly spaced shallow notches or depressions 19 are cut or molded into surfaces 17 and 18 closely adjacent the points of departure of these surfaces from the opposite ends of medial portion 16. Generally opposite the latter an annular recess 20 is cut or molded in the body of sleeve 13 and opens to the outer periphery thereof, thus providing a substantially reduced wall thickness for the medial portion of the sleeve to thereby increase its flexibility. The inner wall of recess 20 is generally arcuate in longitudinal cross section curving downwardly and outwardly into a generally horizontal lower wall 21 which extends to the outer edge of the sleeve. The opposite end of the inner wall extends relatively steeply upwardly and outwardly and then reverses itself downwardly at an angle to form a sharp-edged angular lip 22 depending from the upper margin of recess 20. The outer surface 23 of lip 22 tapers to a small degree downwardly and outwardly from the outer surface of sleeve 13 and when constructed as described, possesses a considerable degree of flexibility for purposes to be hereinafter described. A plurality of angularly spaced passageways 24 are provided to extend through end ring 15 and lower wall 21 of recess 20 to provide communication between the latter and the bore of casing head 1 generally below sealing unit 8. Upper end ring 14 is provided with a number of shouldered notches 25 for engagement of tools employed in inserting and removing the sealing unit from the stuffing box.

The above-described sealing unit is employed in the following manner: Unit 8 is installed in stuffing box 5 and enclosed therein by screwing housing 9 down over the stuffing box until packing 11 is tightly compressed between shoulder 10 and the upper end of stuffing box 5. Unit 8 will thereby be seated between seat shoulder 7 and gland 12 and held against bodily movement longitudinally of the stuffing box. When a pipe 26, such as a conventional well tubing has been inserted through the bore of the casing head into casing 2, medial portion 16 of sleeve 13 will fit snugly about the surface of the pipe and will form therewith a seal for the annular space between pipe 26 and bore 6 of the stuffing box. It will be understood that the normal diameter of the bore of medial portion 16 will ordinarily be made slightly smaller than the outside diameter of pipe 26, its normal flexibility permitting it to expand slightly to accommodate pipe 26, while maintaining a sealing fit therewith. When running pipe 26 into or out of the well, the sealing unit, by virtue of the described construction makes use of such pressure in a novel manner to improve the sealing efficiency of sealing unit 8. First of all, the pressure in casing 2 will be exerted against lower end ring 15 and will tend to push the lower portion of sleeve 13 upwardly, the upper portion being held against upward movement by contact of upper end ring 14 against gland 12. The upward movement of the lower end of sleeve 13 will cause medial portion 16 to flex and press radially inwardly, thus tightening its contact with pipe 26. Secondly, the pressure fluid, whether it be gaseous or liquid, will enter recess 20, which is closed by the wall of stuffing box 5, and will exert pressure on the walls of the recess. A portion of this pressure will, of course, be exerted against the inner wall of the recess, thereby further tightening the sealing action of medial portion 16 on pipe 26. At the same time, the pressure will also be exerted against the inner angular face of lip 22 and will force the latter outwardly to bring tapered outer surface 23 thereof into very tight sealing engagement with the wall of stuffing box 5, thereby preventing the escape of any sealing fluid between the exterior of sleeve 13 and stuffing box 5. Accordingly, it will be seen that the greater the pressure in the well, the tighter will be the sealing action developed by the sealing unit, both on pipe 26 and the wall of stuffing box 5.

Figure 5:
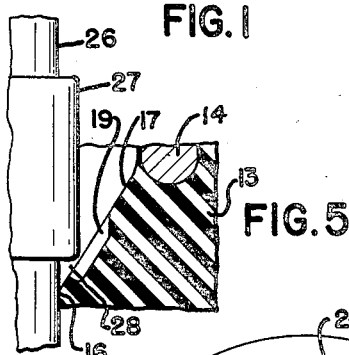
Fig. 5 is a fragmentary view of a portion of the sealing unit in contact with a pipe coupling in passage therethrough.
Figure 3:
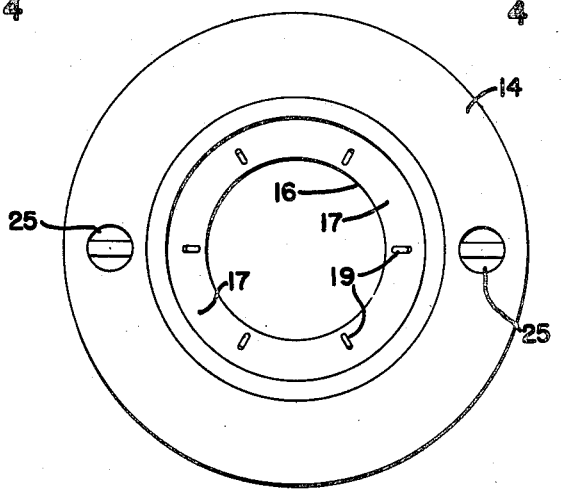
Fig. 3 is top view of the sealing unit.
Figure 4:
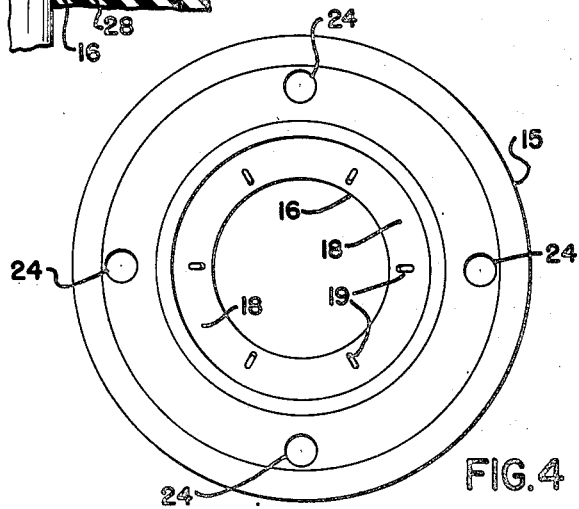
Fig. 4 is a bottom view of the sealing unit.

When it is necessary to pass an enlargement on pipe 26, such as a collar 27, through the sealing unit, the flexibility of medial portion 26 will allow it to expand sufficiently for this purpose while still maintaining tight sealing contact with the collar and without altering the sealing action of lip 22 on the wall of the stuffing box. Depressions 19 serve a very useful function particularly during the passage of collars 27 through the sealing unit. The collars 27 being larger in diameter than pipe 26, their upper and lower edges form outwardly extending shoulders which will strike one of the sloping faces 17 and 18, depending on the direction of movement of the pipe through the sealing unit and tend to form therewith a tightly closed triangular pocket 28 (Fig. 5) in which either air, or any liquid wiped off of the pipe surface by the rubbing action thereon of the sleeve, will be trapped. As the edge of the collar moves over the sloping surface toward the bore of medial portion 16, the pressure on the trapped fluid will be greatly intensified. Depressions 19 now will act as vents or relief ports through which the trapped fluid may freely escape. In the absence of such vents, as in the more conventional types of sealing structures, the trapped fluid, having no means of escape may, and frequently does, blow-out and may tear or otherwise seriously damage the sealing sleeve. It will be understood that the spacing of the lower ends of depressions 19 relative to the bore of medial portion 16, and the dimensions of the depressions may be varied in accordance generally with the difference in the external diameters of pipe 26 and collar 27 so that the edges of the collars will strike an intermediate portion of the depressions to thereby provide passages underneath the edges of the collars which will at all times place pockets 28 in open communication with the bore of the stuffing box.

It will be understood that various alterations and changes may be made in the details of the illustrative embodiment without departing from the scope of the appended claims but within the spirit of this invention.

What I claim and desire to secure by Letters Patent is:

1. A sealing unit for well casing heads, comprising, a generally tubular flexible sleeve member having a medial portion of lesser internal diameter than the ends thereof, oppositely sloping surfaces extending from said medial portion to the opposite ends of said sleeve member, a circumferential recess in the outer periphery of said sleeve member substantially opposite said medial portion, a flexible lip depending from the outer margin of the upper wall of said recess, one or more passageways extending through the wall of said sleeve member between said recess and the interior of said sleeve member below said medial portion, and a plurality of circumferentially spaced depressions in each of said sloping surfaces adjacent the junctures thereof with said medial portion.

2. A sealing unit for well casing heads, comprising, a generally tubular flexible sleeve member having a medial portion of lesser internal diameter than the ends thereof, oppositely sloping surfaces extending from said medial portion to the opposite ends of said sleeve member, a circumferential recess in the outer periphery of said sleeve member substantially opposite said medial portion, a flexible lip depending from the outer margin of the upper wall of said recess, the exterior surface of said lip tapering downwardly and outwardly with respect to the outer periphery of said sleeve member, one or more passageways extending through the wall of said sleeve member between said recess and the interior of said sleeve member below said medial portion, and a plurality of circumferentially spaced depressions in each of said sloping surfaces adjacent the junctures thereof with said medial portion.

DAVID C. WALKER.

REFERENCES CITED

The following references are of record in the file of this patent:

UNITED STATES PATENTS

| Number | Name | Date |
| --- | --- | --- |
| 1,772,210 | Dale | Aug. 5, 1930 |
| 1,983,938 | Humason et al. | Dec. 11, 1934 |
| 2,176,355 | Otis | Oct. 17, 1939 |

FOREIGN PATENTS

| Number | Country | Date |
| --- | --- | --- |
| 6,604 | Great Britain | of 1895 |